Figure 1:
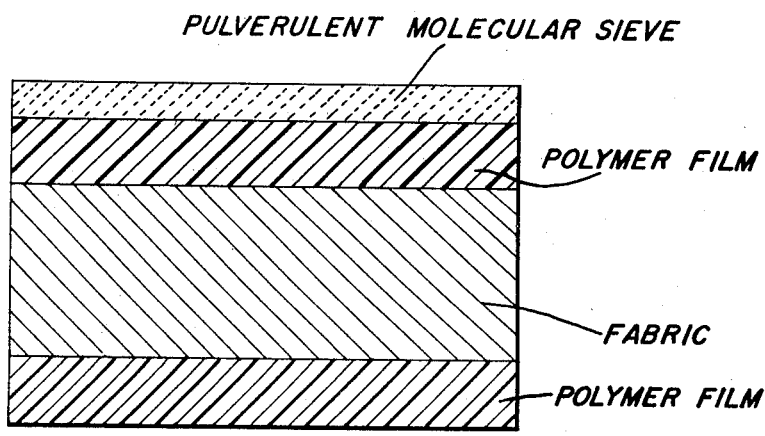
Figure 2:
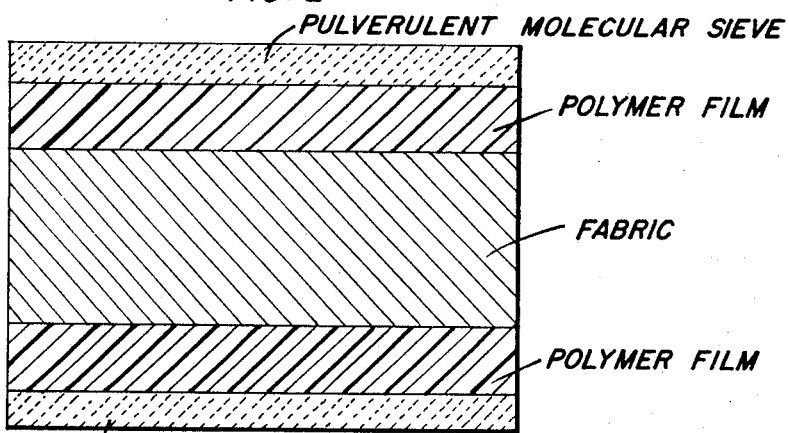

George L. Braude
Edwin W. Lard
INVENTORS

United States Patent Office 3,431,133
Patented Mar. 4, 1969

3,431,133
FABRIC COATED WITH BINDER AND PULVERULENT MOLECULAR SIEVE AND PROCESS OF MAKING SAME

George L. Braude, North Linthicum, and Edwin W. Lard, Bowie, Md., assignors to W. R. Grace & Co., New York, N.Y., a corporation of Connecticut Filed Oct. 12, 1966, Ser. No. 586,143
U.S. Cl. 117—24 11 Claims
Int. Cl. A62d *9/00*; A62b *17/00*

This invention relates to a novel and useful laminating process. More particularly, it relates to a laminating process, whereby a laminate suitable for protecting personnel against organic phosphorus poisons is prepared.

In summary, this invention is directed to a process for preparing a flexible, breathable, self-supporting, protective, self-decontaminating laminate suitable for protecting personnel against organophosphorus poisons comprising: (a) impregnating a fabric made from fibers selected from the group consisting of natural fibers and synthetic fibers with about 0.5–30%, based on the weight of the fabric, of a binder selected from the group consisting of solutions and dispersions of flexible film-forming polymers, the binder consisting essentially of about 1–70 parts of polymer and about 30–99 parts of diluent; said binder being added in such quantity as to provide a fabric:polymer weight ratio of about 200:1 to 3:1, said ratio being based on the dry weights of fabric and polymer; (b) evenly distributing over at least one surface of the impregnated fabric about 2–30%, based on the dry weight of said fabric, of a pulverulent molecular sieve having a pore diameter of about 4–10 A. and a particle diameter of about 3–800 microns; and (c) drying the thus treated fabric, thereby to produce a flexible, breathable, self-supporting, protective, self-decontaminating laminate suitable for protecting personnel against organophosphorus poisons.

In preferred embodiments of this invention: (a) about 10–20% based on the dry weight of the fabric, of a pulverulent molecular sieve having a pore diameter of about 10 A. and a particle diameter of about 5–50 microns is distributed evenly over the surface of the impregnated fabric before drying said fabric; (b) the pulverulent molecular sieve is impregnated with about 1–20%, based on the weight of the molecular sieve, of dimethyl sulfoxide before adding the sieve to the impregnated fabric; (c) the impregnated fabric is partially dried before distributing, or coating, the pulverulent molecular sieve over the surface of said fabric; and (d) the binder-impregnated molecular sieve-coated fabric is dried at about 40–120° C. while maintained under a pressure of about 0.03–0.08 atmosphere.

This invention is also directed to an article of manufacture comprising a self-supporting, flexible, breathable, protective, self-decontaminating laminate, said laminate having: (a) a substrate comprising a fabric made from fibers; (b) a flexible, breathable film of film-forming polymer, said film being impregnated through and bonded to the substrate, thereby to form two exposed surfaces of said film, substrate:film weight ratio being about 200:1 to 3:1; (c) at least one coating comprising at least one molecular sieve, said molecular sieve being in pulverulent form and having a pore diameter of about 4–10 A. and a particle diameter of about 3–800 microns, said coating being bonded at least to one exposed surface of the film of polymer, the substrate:molecular sieve weight ratio being about 50:1 to 3:1.

In a preferred embodiment of this invention the pore diameter of pulverulent molecular sieve present in the aforesaid self-decontaminating laminate is about 10 A. and the particle diameter of said molecular sieve is about 5–50 microns.

In a preferred embodiment of this invention the pulverulent molecular sieve component of the self-decontaminating laminate is impregnated with dimethyl sulfoxide before said molecular sieve is incorporated into said article; the weight ratio of molecular sieve:dimethyl sulfoxide being about 100:1 to 5:1.

In preferred embodiments of this invention, protective clothing is made from the self-decontaminating laminates of this invention—such clothing being made from laminates in which the molecular sieve component has been treated, or impregnated, with dimethyl sulfoxide before being incorporated in the laminates and from laminates in which the molecular component has not been so treated.

In a preferred embodiment of this invention the weight ratio of substrate:polymer in the aforesaid self-decontaminating laminate is about 50:1 to 17:1.

In the drawing: FIGS. I and II are schematic diagrams, or representations, of the laminates of this invention.

It is an object of this invention to prepare a new and novel laminate.

It is another object of this invention to prepare a new and novel flexible, breathable, self-supporting, protective, self-decontaminating laminate suitable for protecting personnel against organophosphorus poisons.

Organophosphorus poisons are well known substances. Among these are malathion (S-(1,2-dicarbethoxyethyl)-O,O-dimethyldithiophosphate), tetraethyl pyrophosphate, parathion (O,O-diethyl O-p-nitrophenyl thiophosphate), Tabun (dimethylphosphoramidocyanatidate), Sarin (isopropyl methylphosphonofluoridate), and Soman (1,2,2-trimethylpropyl methylphosphonofluoridate). A large number of organophosphorus poisons are listed in U.S. Patent No. 3,242,043. Organophosphorus poisons have found use as insecticides since they are highly toxic to insects. Other organophosphorus poisons have been considered for use in military operations and some of them are called nerve gases. Many organophosphorus poisons, including a number of those used as insecticides, are extremely toxic to humans. Thus, it is highly desirable that (in addition to conventional respiratory protectors) protective clothing be available to protect people who are engaged in the manufacture of such poisons or who handle, apply, or are otherwise exposed to such poisons.

We have made the surprising and completely unobvious discovery that a self-decontaminating laminate, which is self-supporting, can be prepared by: (a) impregnating, or coating, a fabric with about 0.5–20%, based on the weight of the fabric, of a binder selected from the group consisting of solutions and dispersions of flexible film-forming polymers, the binder consisting essentially of about 1–70 parts of polymer and about 30–99 parts of diluent; said binder being added in such quantity as to provide a fabric:polymer weight ratio of about 200:1 to 3:1, said ratio being based on the dry weights of fabric and polymer; (b) adding to and evenly distributing over the thus coated, or impregnated, surface of the fabric about 2–30%, based on the dry weight of the fabric, of a pulverulent molecular sieve having a pore diameter of about 4–10 A. (preferably about 10 A.) and a particle diameter about 3–800 microns; and (c) drying the thus treated fabric, whereby a self-supporting, protective, self-decontaminating laminate suitable for protecting personnel against organophosphorus poisons is obtained.

By "drying" is meant evaporating "moisture" (i.e., a diluent as disclosed and described infra), which was added as a component of the binder, until the thus treated fabric is substantially free of such diluent. The drying temperature can be ambient temperature (e.g., ca. 60–95° F.) or an elevated temperature. However, the drying temperature must be such that neither the polymer (added as a component of the binder) nor the fabric will be melted, charred, burned, or otherwise damaged or decomposed by heat. Since molecular sieves strongly bind, or retain, most diluents—especially water—we have found that the use of vacuum (i.e., reduced pressure) is generally necessary to dry fabrics which have been treated with binder and a molecular sieve according to the method of this invention. Pressures ranging from a few mm. (e.g., 2–30 mm. of Hg) up to about 0.9 atmosphere have been used with excellent results. We generally prefer to use a drying temperature of about 40–120° C. and a pressure of about 0.03–0.8 atmosphere; however, we have used lower pressures and higher temperatures with excellent results.

In an embodiment of this invention, which is especially useful where using binders comprising solutions of flexible film-forming polymers, the binder is partially dried after it is applied to the fabric and before the pulverulent molecular sieve is distributed over the surface of the impregnated (i.e., binder-treated) fabric. This procedure has been found to avoid completely submerging large numbers of the molecular sieve particles in highly liquid binder compositions which can result in plugging, or blocking, many pores of said particles. Where using this embodiment, the impregnated fabric is dried, as described supra, but, in this instance, before applying pulverulent molecular sieve, and drying is discontinued when the binder adhering to the fabric becomes "tacky."

A binder is "tacky" if it will cling to a small (i.e., ca. $1/16$–$1/8$ inch diameter) wooden rod which is brought into firm contact with a body of said binder and then slowly withdrawn from such contact, thereby to form at least one fiber of plastic—said fiber being connected, or attached, to both the rod and the body of said binder—which can be drawn out to a length of about $1/8$–$1/4$ inch before breaking.

Since it is not practical to test an impregnated fabric for "tackiness" by the above-described test, a thin layer (e.g., ca. $1/8$ inch thick) of the particular binder under consideration is placed in each of several small tared dishes. Each dish is then weighed and placed in a drying oven at a predetermined temperature ranging from about 40–120° C. depending on the vapor pressure of the diluent present in the binder. Diluents with higher vapor pressures require lower temperatures than those with lower vapor pressures. From time-to-time during the heating, or drying, process a dish is removed from the oven, cooled to ambient temperature (ca. 25° C.), weighed, and its weight loss recorded. The thus weighed sample of binder is then subjected to the above-described tackiness test. When a sample having the desired tackiness is obtained, the percentage weight loss (based on the original weight of the binder) is calculated; this percentage is designated the "tackiness number" for the particular binder under test.

Fabric samples impregnated with the particular binder tested are then dried until the percentage weight loss (calculated on the basis of the binder applied to the fabric) is substantially the same as the aforesaid tackiness number. Pulverulent molecular sieve is then evenly distributed over the surface of the partially dried impregnated fabric which is then dried until substantially free of diluent, thereby to produce a flexible, breathable, self-supporting, self-decontaminating laminate suitable for protecting personnel against organophosphorus poisons.

In some instances after evenly distributing (e.g., by dusting, spraying, or the like) the pulverulent molecular sieve over the surface of the binder-impregnated fabric (which, as stated supra, can be partially dried before applying the molecular sieve particles) we have used mechanical pressure (e.g., a roller, the blade of a spatula, or the like) to enhance the bonding, or adhesion, between the binder (and hence, the polymeric film formed on drying the binder) and the particles of molecular sieve, thereby to form a laminate which more firmly retains the particles of molecular sieve under actual use conditions.

We have obtained excellent results with fabrics made from fibers selected from the group consisting of natural fibers and synthetic fibers. Suitable natural fibers include wool, cotton, silk, linen, ramie, jute, hemp, asbestos, and sisal. Synthetic fibers with which we have obtained excellent results include nylons, polyesters, glass fiber, rock wool fiber, and rayons including viscose and acetate rayons. Other fibers which are well suited for use in the process of this invention will, as a consequence of the disclosures made herein, be readily apparent to those skilled in the art. The fiber must not be soluble in the diluent in which the polymer component of the binder is suspended or dissolved. The fabrics used in the process of this invention can be woven fabrics or nonwoven fabrics. We have obtained excellent results with both woven fabrics and nonwoven fabrics.

We have obtained excellent results, in the process of this invention, where using binders comprising about 1–70 parts of polymer and about 30–99 parts of diluent. However, we prefer to use binders comprising about 10–30 parts of polymer and about 70–90 parts of diluent.

Polymer-diluent systems suitable for use in the process of this invention include solutions of flexible film-forming polymers in solvents and dispersions of flexible film-forming polymers in media. Such dispersions include suspensions, emulsions, and latexes. The term diluent, as stated supra, includes both solvents in which the film-forming polymers are soluble and media in which such polymers can be dispersed to form dispersions, or suspensions, including latexes and emulsions. Diluents which we have found to be especially useful in the process of this invention include water, tetrahydrofuran, chloroform, carbon tetrachloride, ethylene dichloride, methanol, ethanol, isopropyl alcohol, acetone, toluene, xylene, acetonitrile, hexane, heptane, dimethyl formamide dimethyl sulfoxide and mixtures thereof. Other diluents which can be used with excellent results in the process of this invention will, on the basis of the disclosure herein presented, be readily apparent to those skilled in the art.

Flexible film-forming polymers with which we have obtained excellent results include homopolymers of vinyl chloride, copolymers of vinylidene chlorides with monomers selected from the group consisting of methyl acrylate, ethyl acrylate, acrylamide, and acrylonitrile, homopolymers of vinyl acetate and copolymers of vinyl acetate with monomers selected from the group consisting of methyl acrylate, ethyl acrylate, acrylamide, and acrylonitrile. We have also obtained excellent results using copolymers in which polyvinyl chloride was the principal constituent. Where using copolymers of vinylidene chloride, we prefer to use those in which polyvinylidene chloride constitutes the major component; however, we have obtained excellent results with copolymers of vinylidene chloride in which the vinylidene chloride is not the major component. Where using the copolymers of vinyl acetate, we prefer to use those in which polyvinyl acetate is the major component; however, we have obtained excellent results with such copolymers in which the polyvinyl acetate was not a major component. We have also obtained excellent results with copolymers of acrylic acid with acrylonitrile and the like. Other polymers which can be used with excellent results in the process of this invention, will, on the basis of the disclosure herein presented, be readily apparent to those skilled in the art.

Where using dispersions of film-forming polymers (i.e., film-forming emulsions, film-forming suspensions, or film-forming latexes) in the process of this invention, we have obtained excellent results with dispersions in which the polymer particles had diameters ranging from about 100 A. to about 100,000 A.; however, we prefer to use polymer particles ranging in diameter from about 700 A. to about 4,000 A.

Molecular sieves are large surface area inorganic sorbents consisting essentially of alkali metal and alkaline earth metal aluminum silicates. As used herein the term "alkali metal" includes sodium, potassium, lithium, and mixtures thereof, and the term "alkaline earth metal" includes calcium, strontium, barium, and mixtures thereof. The term "molecular sieves" as used herein includes both natural and synthetic alkali metal and alkaline earth metal aluminum silicates; said term also includes mixed alkali metal-alkaline earth metal aluminum silicates.

While we have obtained excellent results with molecular sieves having pore diameters of about 4–10 or more A. we prefer to use molecular sieves having pore diameters of about 10 A. We have obtained excellent results using pulverulent molecular sieves having particles ranging in size (diameter) from about 3 to 800 microns. However, we prefer to use molecular sieves having a particle size range of about 5–50 microns. The molecular sieves used in the process of this invention can be naturally occurring minerals such as mordenite (which has a pore diameter of about 7 A.) or synthetic molecular sieves.

We have applied (i.e., evenly distributed) pulverulent molecular sieves over the surfaces of binder-impregnated substrates (fabrics) by dusting, by spraying, by using a spatula as a doctor blade to distribute the molecular sieve particles over the surfaces of such substrates, and by using a brush to distribute such particles over the surfaces of such substrates. All of these methods have given excellent results. Still other methods for distributing such particles over substrates will, as a result of our disclosure, be readily apparent to those skilled in the art.

In one embodiment of this invention we apply particles of pulverulent molecular sieves to only one surface of binder-impregnated fabric; in another embodiment, said particles are applied to both surfaces of such fabric. Both of these embodiments have produced excellent results.

We have found that organophosphorus poisons are absorbed and decontaminated by the pulverulent molecular sieves present in the laminates of our invention. Said molecular sieves decontaminate such poisons (i.e., render the poisons substantially non-toxic to humans) by permanently attaching said poisons to the inner surfaces of the molecular sieves, by decomposing the poisons, or by firmly bonding the poisons to said inner surfaces, thereby to make said laminates protective (i.e., capable of protecting personnel clothed in clothing made of said laminate against the toxic effects of organophosphorus poisons) and self-decontaminating. (See Example I.)

We have made protective clothing from the laminates of our invention and have found that such clothing protects animals (dogs and monkeys) and humans clothed therein against the toxic effects of organophosphorus poisons, including tetraethyl pyrophosphate, and parathion contacting such clothing. Protective clothing tested included body blankets for dogs, coats and trousers for monkeys, and coats, trousers, hoods, gloves, and shoe coverings for humans.

Our invention will be further illustrated by the following examples which are illustrative only and which are not intended to limit the scope of the invention.

Example I

Ambient air (ca. 25° C., 60% relative humidity) was saturated with tetraethyl pyrophosphate (hereinafter called "TEPP") by bubbling said air, at about 2 cubic feet per hour, through TEPP in two tubes arranged in series, thereby to produce a stream of TEPP-saturated air.

A sidestream of the thus prepared TEPP-saturated air was diluted with a stream of ambient air to provide a TEPP-laden air stream containing about 25 micrograms of TEPP per liter, as determined by a conventional gas chomatographic procedure.

The stream of TEPP-laden air stream was passed through a vertically positioned tube packed with 1 g. of pulverulent molecular sieve having a particle diameter of about 5–50 microns and a pore diameter of about 10 A. Air from the tube of pulverulent molecular sieve was analyzed for TEPP by the above-mentioned procedure and found to be substantially free of TEPP, thereby showing that the TEPP was absorbed from the stream of TEPP-laden air by the pulverulent molecular sieve. After passing the stream of TEPP-laden air through the tube of pulverulent molecular sieve for about 6 hours, a representative aliquot (0.2 g.) of the pulverulent molecular sieve was removed from the tube and extracted repeatedly with methanol (a solvent for TEPP), thereby to produce a methanol extract containing TEPP. Said extract was analyzed for TEPP by a conventional procedure based on gas chromatography. Calculations, based on the aliquot of molecular sieve extracted with methanol, showed that only about 0.2% of the TEPP which was absorbed from the TEPP-laden air stream by the pulverulent molecular sieve was recovered by extracting with methanol, thereby to establish that pulverulent molecular sieves of the type used in this invention absorbs and decontaminates (i.e., decomposes, permanently attaches to the inner surfaces of the molecular sieves, or firmly bonds to such surfaces) TEPP.

Substantially identical results were obtained with a number of other organophosphorus poisons including Sarin and with pulverulent molecular sieves having pore diameters of about 4–10 or 12 A. and particle sizes ranging from about 3–800 microns, thereby to establish that molecular sieves of the types used in the laminates of our invention decontaminate organophosphorus poisons.

Example II

A 25 g. sheet of fabric (cotton sateen weighing about 8.5 ounces per square yard) was impregnated with about 25 g. of a binder comprising a solution of a copolymer of vinylidene chloride and ethyl acrylate in a diluent consisting essentially of tetrahydrofuran; said solution having a solid content of about 20%. A rubber roller was used to evenly distribute the binder over the surface of the fabric. The thus impregnated fabric was partially dried (i.e., dried until the binder became tacky) at about 55° C. under a pressure of about 1 atmosphere. The partially dried impregnated fabric was cooled. About 10 g. of pulverulent sieve having a pore diameter of about 10 A. and a particle diameter of about 5–50 A. was evenly distributed (by dusting) over one surface of the cooled, partially dried, impregnated fabric which was then dried (at about 80° C. under a pressure of about 0.05 atmosphere) until substantially free of said diluent, whereby a flexible, breathable, self-supporting, self-decontaminating laminate was obtained; said laminate was comprised of a flexible, breathable film of film-forming polymer bonded to the aforesaid fabric (said fabric constituting a substrate) and a coating, or layer, of the aforesaid pulverulent molecular sieve bonded to said film. Said laminate was labeled "Laminate A."

Example III

A portion of Laminate A was positioned between two sections of a stainless steel permeability cell in such manner that air flowing through the cell from the upstream end to the downstream end must permeate through the laminate. The cell was closed and sealed by bolting two outer flanges together. Ambient air (ca. 30° C., 80% relative humidity) containing about 75 micrograms per liter of tetraethyl pyrophosphate was passed through the laminate at the rate of about 2 cubic feet per hour for a period of about .6 hours. Samples were continuously collected upstream and downstream of the laminate and analyzed by a conventional procedure using gas chromatography. It was found that 98% of the tetraethyl pyrophosphate had been remvoed from the air stream by the laminate.

A control was run using the general procedure described in the preceding paragraph; however, in this instance, Laminate A was replaced by a piece of fabric from the same lot used to prepare said Laminate A. In this instance only about 25% of the tetraethyl pyrophosphate was removed from the air stream by the untreated fabric.

Example IV

The sides, back, and belly regions of a rat were shaved, and the shaved portions of said rat were wrapped in a strip of Laminate A. TEPP at a rate of about 200 mg./kg. of the rat's body weight was distributed over the surface of the laminate which covered the shaved portions of the rat's body. At the end of three hours the laminate was removed from the rat and the animal was examined. This rat showed only slight intoxication from the treatment. Said rat recovered completely in about three hours.

A control was run using a control rat of approximately the same body weight as the first. However, in this instance an untreated fabric (from the same lot used to prepare Laminate A) was used in place of Laminate A. TEPP was applied to this cloth at the rate of 200 mg./kg. of the rat's body weight. At the end of two hours the control rat was dead.

Example V

About 30 g. of a binder comprising a latex (i.e., an aqueous suspension) of a copolymer of vinylidene chloride and vinyl chloride having a solid content of about 30% was applied to a sheet of fabric (a Dacron (polyester) fabric weighing about 4.5 ounces per square yard) weighing about 35 g. the binder was spread evenly over the surface of the fabric with a rubber roller, thereby to impregnate said fabric with binder. About 12 g. of pulverulent molecular sieve having a pore diameter of about 10 A. and a particle diameter of about 5–50 microns was evenly distributed (dusted) over the surface of the binder-impregnated fabric which was then dried (at about 115° C. at about 0.04 atmosphere) until substantially free of diluent, thereby to produce a flexible, breathable, self-supporting, self-decontaminating laminate having a substrate comprising a fabric made from fibers, a flexible, breathable film of film-forming polymer bonded to said substrate, and a coating of pulverulent molecular sieve bonded to said film. This laminate was labeled "Laminate B."

Example VI

The general procedure of Example III was repeated; however, in this instance Laminate B was used in place of the Laminate A which was used in Example III.

In this instance over 99% of the organic phosphorus poison was removed from the air stream by the laminate.

A control was run using untreated fabric from the same lot used to prepare Laminate B. In this instance, only about 20% of the organophosphorus poison was removed from the air stream by the untreated cloth.

Example VII

The general procedure of Example IV was repeated, but in this instance Laminate A was replaced by Laminate B, the TEPP was replaced by Parathion at the rate of 400 mg./kg. of the rat's body weight, and the fabric used in the control was taken from the same lot as that used to prepare Laminate B. The results obtained were substantially identical with those obtained in Example IV.

Example VIII

The general procedure of Example V was repeated; however, in this instance the process was modified by impregnating the pulverulent molecular sieve with about 6% (based on the weight of the molecular sieve) of dimethyl sulfoxide before distributing the pulverulent molecular sieve over the binder-impregnated fabric. Such impregnation was accomplished by adding about 6 g. of dimethyl sulfoxide to 100 g. of the pulverulent molecular sieve, stirring the resulting mixture and heating said mixture, in a closed container, overnight (ca. 18 hours) at about 70° C. The resulting laminate was labeled "Laminate C".

A similar laminate, designated and labeled "Laminate D" was prepared, but in this instance the dimethyl sulfoxide was dissolved in chloroform (ca. 1 part dimethyl sulfoxide to about 3 parts chloroform) and the resulting solution was added to the pulverulent molecular sieve which was heated to about 65° C. for about 16 hours before being applied to the binder-impregnated fabric. About 3% (based on the weight of the molecular sieve) of dimethyl sulfoxide was applied to the molecular sieve, and about 8 g. of molecular sieve (based on the dimethyl sulfoxide-chloroform-free weight of the molecular sieve) was applied to the binder-impregnated fabric.

Example IX

The general procedure of Example III was repeated; however, in this instance, Laminate C was used in place of Laminate A, and the fabric used as a control was taken from the same lot as that used in the preparation of Laminate C. The results obtained in this instance were substantially identical to those obtained in Example III.

Example X

The general procedure of Example IV was repeated; however, in this instance Laminate C was used in place of Laminate A, and the fabric used as a control was taken from the same lot as that used in the preparation of Laminate C. The results obtained in this instance were substantially identical to those obtained in Example IV.

Example XI

The general procedure of Example V was repeated; however, in this instance: (a) the fabric was a sateen woven from 50% by weight nylon and 50% by weight of cotton and weighing 9 ounces per square yard; (b) the binder was an aqueous suspension (i.e., latex) of a copolymer of vinylidene chloride and acrylonitrile having a solid content of about 20%; (c) the molecular sieve had a pore diameter of about 5 A. and a particle diameter of about 70–150 microns; (d) said binder was applied to the fabric at the rate of about 70 g. of binder per 100 g. of fabric; (e) and the pulverulent molecular sieve was applied to the resulting binder-impregnated fabric at the rate of about 20 g. of molecular sieve per 100 g. (dry weight) of fabric. The resulting laminate was labeled "Laminate E."

Example XII

The general procedure of Example II was repeated; however, in this instance Laminate D was used in place of Laminate A, and the fabric used as the control was taken from the same lot as the fabric used to prepare Laminate D. The results obtained were substantially identical to those obtained in Example III.

Example XIII

The general procedure of Example IV was repeated; however, in this instance, Laminate D was used in place of Laminate A, and the fabric used as the control was taken from the same lot as the fabric used to prepare Laminate D. The results were substantially identical to those obtained in Example IV.

Example XIV

The general procedure of Example III was repeated; however, in this instance Laminate E was used in place of Laminate A, and the fabric used as the control was taken from the same lot as the fabric used to prepare Laminate E. The results obtained were substantially identical to those obtained in Example III.

Example XV

The general procedure of Example IV was repeated; however, in this instance, Laminate E was used in place of Laminate A, and the fabric used as the control was taken from the same lot as the fabric used to prepare Laminate E. The results were substantially identical to those obtained in Example IV.

Example XVI

The general procedure of Example II was repeated; however, in this instance the pulverulent molecular sieve was evenly distributed over the two (top and bottom) surfaces of the partially dried binder-impregnated fabric, and a total of 12 g. of said molecular sieve was so applied (i.e., distributed). The resulting laminate was labeled "Laminate F."

Example XVII

The general procedure of Example III was repeated; however, in this instance Laminate F was used in place of Laminate A, and the fabric used as the control was taken from the same lot as the fabric used to prepare Laminate F. The results obtained were substantially identical to those obtained in Example III.

Example XVIII

The general procedure of Example IV was repeated; however, in this instance, Laminate F was used in place of Laminate A, and the fabric used as the control was taken from the same lot as the fabric used to prepare Laminate F. The results were substantially identical to those obtained in Example IV.

As used herein the term "percent" (%) means percent by weight, unless otherwise defined where used, the term "parts" means parts by weight, unless otherwise defined where used; the term "A." means Angstrom units; the term "microgram" means 0.001 milligram; the term "g." means gram; the term "kg." means kilogram; the term "mg./kg." means milligrams per kilogram; and the term "mm. of Hg" means millimeters of mercury pressure.

All pressures are expressed in absolute (e.g., mm. of Hg or atmospheres) as distinct from gauge pressures.

The term "breathable" as applied to the laminates of this invention, means that the laminates are sufficiently permeable to air and moisture to permit the evaporation of perspiration from individuals wearing protective clothing made from said laminates, thereby to make such clothing reasonably comfortable in warm and humid climates.

What is claimed is:

1. A process for preparing a flexible, breathable, self-supporting, protective, self-decontaminating laminate suitable for protecting personnel against organophosphorus poisons comprising:
   (a) impregnating a fabric made from fibers selected from the group consisting of natural fibers and synthetic fibers with about 0.5–30%, based on the weight of the fabric, of a binder of solutions or dispersions of flexible film-forming polymers, the binder consisting essentially of about 1–70 parts of polymer and about 30–99 parts of diluent; said binder being added in such quantity as to provide a fabric:polymer weight ratio of about 200:1 to 3:1, said ratio being based on the dry weights of fabric and polymer;
   (b) evenly distributing over at least one surface of the impregnated fabric about 2–30%, based on the dry weight of said fabric, of a pulverulent molecular sieve having a pore diameter of about 4–10 A. and a particle diameter of about 3–800 microns; and
   (c) drying the thus treated fabric, thereby to produce a flexible, breathable, self-supporting, protective, self-decontaminating laminate suitable for protecting personnel against organophosphorus poisons.

2. The process of claim 1 in which about 10–20%, based on the dry weight of the fabric, of a pulverulent molecular sieve having a pore diameter of about 10 A. and a particle diameter of about 5–50 microns is distributed evenly over at least one surface of the impregnated fabric before drying said fabric.

3. The process of claim 1 in which the pulverulent molecular sieve is impregnated with about 1–20%, based on the weight of the molecular sieve, of dimethyl sulfoxide before distributing the sieve over the impregnated fabric.

4. The process of claim 1 in which the treated fabric is dried at about 40–120° C. while maintained under a pressure of about 0.03–0.8 atmosphere.

5. The process of claim 1 in which the impregnated fabric is partially dried before distributing the pulverulent molecular sieve over the surface of said fabric.

6. An article of manufacture comprising a self-supporting, flexible, breathable, protective, self-decontaminating laminate, said laminate having:
   (a) a substrate comprising a fabric made from fibers;
   (b) a flexible, breathable film of film-forming polymer, said film being impregnated through and bonded to the substrate, thereby to form two exposed surfaces of said film, the substrate:film weight ratio being about 200:1 to 3:1;
   (c) at least one coating comprising at least one molecular sieve, said molecular sieve being in pulverulent form and having a pore diameter of about 4–10 A. and a particle diameter of about 3–800 microns, said coating being bonded at least to one exposed surface of the film of polymer, the substrate:molecular sieve weight ratio being about 50:1 to 3:1.

7. The article of claim 6 in which the pore diameter of the pulverulent molecular sieve is about 10 A. and the particle diameter of said pulverulent molecular sieve is about 5–50 microns.

8. The article of claim 6 in which the pulverulent molecular sieve is impregnated with dimethyl sulfoxide, the weight ratio of molecular sieve:dimethyl sulfoxide being about 100:1 to 5:1.

9. An article of manufacture comprising protective clothing made from the laminate of claim 6.

10. The article of claim 6, said article having a coating of the pulverulent molecular sieve bonded to two surfaces of the film of polymer.

11. The article of claim 6 in which the weight ratio of substrate:polymer is about 50:1 to 17:1.

References Cited

UNITED STATES PATENTS

| | | | |
|---|---|---|---|
| 1,839,168 | 12/1931 | Stampe | 117—169 |
| 2,173,781 | 9/1939 | Gibello | 161—53 |
| 2,984,584 | 5/1961 | Glarum | 117—76 |
| 3,347,245 | 10/1967 | Hawkins | 117—100 X |

WILLIAM D. MARTIN, *Primary Examiner.*

U.S. Cl. X.R.

2—2; 117—27, 33, 135.5